(12) United States Patent
Fujita

(10) Patent No.: US 9,074,071 B2
(45) Date of Patent: Jul. 7, 2015

(54) HEAT RAY SHIELDING SHEET MATERIAL AND LIQUID ADDITIVE FOR USE IN PRODUCING THE SAME

(75) Inventor: Kennichi Fujita, Ichikawa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 10/480,940

(22) PCT Filed: May 7, 2003

(86) PCT No.: PCT/JP03/05673
§ 371 (c)(1),
(2), (4) Date: Jan. 8, 2004

(87) PCT Pub. No.: WO03/095561
PCT Pub. Date: Nov. 20, 2003

(65) Prior Publication Data
US 2004/0131845 A1    Jul. 8, 2004

(30) Foreign Application Priority Data

May 13, 2002 (JP) ................................ 2002-136457

(51) Int. Cl.
C08K 3/38 (2006.01)
B32B 5/16 (2006.01)
C08J 7/04 (2006.01)

(52) U.S. Cl.
CPC ................. *C08K 3/38* (2013.01); *Y10T 428/25* (2015.01); *Y10T 428/256* (2015.01); *C08J 7/047* (2013.01); *C08K 2201/003* (2013.01)

(58) Field of Classification Search
None
See application file for complete search history.

(56) References Cited

U.S. PATENT DOCUMENTS

| 3,947,837 | A | * | 3/1976 | Bitterice | 340/550 |
| 4,128,694 | A | * | 12/1978 | Fabel et al. | 428/412 |
| 5,350,613 | A | * | 9/1994 | Deprez et al. | 428/43 |
| 5,425,977 | A | * | 6/1995 | Hopfe | 428/141 |
| 5,518,810 | A | * | 5/1996 | Nishihara et al. | 428/328 |
| 6,180,224 | B1 | * | 1/2001 | Shouji et al. | 428/323 |
| 6,319,613 | B1 | * | 11/2001 | Takeda et al. | 428/412 |
| 6,620,872 | B2 | * | 9/2003 | Fisher | 524/403 |
| 7,074,351 | B2 | * | 7/2006 | Dobler et al. | 252/587 |
| 7,169,834 | B2 | * | 1/2007 | Dobler et al. | 524/10 |
| 2004/0071957 | A1 | * | 4/2004 | Fujita | 428/328 |

FOREIGN PATENT DOCUMENTS

| DE | 699 30 822 T2 | 11/2006 |
| EP | 0 008 133 B1 | 4/1982 |
| EP | 0864 920 A1 | 9/1998 |
| EP | 0 905 100 A1 | 3/1999 |
| EP | 0 943 587 A1 | 9/1999 |
| EP | 1 008 564 A1 | 6/2000 |
| JP | A 61-277437 | 12/1986 |
| JP | 02136230 A * | 5/1990 |
| JP | A 02-173060 | 7/1990 |
| JP | A 05-043304 | 2/1993 |
| JP | A 05-078544 | 3/1993 |
| JP | A 11-181336 | 7/1999 |
| JP | A 2000-096034 | 4/2000 |
| JP | 2000178428 A * | 6/2000 |
| JP | A 2000-169765 | 6/2000 |
| JP | A 2001-311006 | 11/2001 |
| JP | A 2002-080736 | 3/2002 |
| JP | 2002369629 A * | 12/2002 |

OTHER PUBLICATIONS

Office Action for German Application No. 10392543.0, mailed Dec. 20, 2010.

* cited by examiner

*Primary Examiner* — Monique Jackson
(74) *Attorney, Agent, or Firm* — Oliff PLC

(57) ABSTRACT

An object of the present invention is to provide a heat wave shielding material which can be manufactured by a simple method without using a complicated manufacturing method or a high cost physical film-formation method, maintains excellent visible light transmittancy, exhibits high heat wave shieldability, and, furthermore, is excellent in strength such as impact resistance. The heat wave shielding resin sheet which has a maximum transmittance in the visible light region and at the same time a minimum transmittance in the near-infrared region exhibiting strong absorption is realized by dispersing hexaboride fine particles such as $LaB_6$ as a heat wave shielding component in polycarbonate resin or acrylic resin. ITO fine particles and/or ATO fine particles can be dispersed together with the hexaboride fine particles.

3 Claims, No Drawings

HEAT RAY SHIELDING SHEET MATERIAL AND LIQUID ADDITIVE FOR USE IN PRODUCING THE SAME

TECHNICAL FIELD

The present invention relates to a heat wave shielding resin sheet which is applied to an opening of a roof, a wall, an arcade, a ceiling dome, etc. of buildings or a window of a vehicle, is good in visible light transmission, excellent in heat wave shieldability, and further more, is excellent in impact resistance and water resistance.

BACKGROUND ART

Hitherto, the so-called openings such as windows of various buildings or vehicles are constructed with a transparent piece of glass or resin to allow sunlight through. However, sunlight contains ultraviolet light and infrared light in addition to visible light. Especially, near-infrared light between 800 nm to 2500 nm out of infra-red light are called heat waves, which cause the temperature inside a room to increase due to the heat waves coming inside from the opening.

Therefore, in recent years, a heat wave shielding material which blocks heat waves while still allowing a sufficient amount of visible light to enter and restrains a temperature increase inside a room while keeping brightness simultaneously, has been studied as a window material for various buildings and vehicles, and various steps are proposed for that purpose.

For instance, a heat wave shielding board in which a heat wave reflection film made by vapor deposition of metal on a transparent resin film is bonded to a transparent base material such as a glass board, an acrylic resin board, a polycarbonate resin board or the like is proposed in Japanese Patent Laid-open No. Sho 61-277437. However, since the heat reflection film itself is not only very expensive, but also requires complicated processing such as bonding and so on, this method has the disadvantage of being extremely costly. Further, since the bond between the transparent base material and the heat reflection film is not durable, peeling of the heat reflection film can occur over time.

Further, a number of heat wave shielding boards made by direct vapor deposition of metal or metal oxide on the surface of a transparent base material have been proposed. However, since these methods need a vapor deposition apparatus which requires a high vacuum or highly accurate environmental control, there arises problems that they suffer from poor mass productivity, lack of general versatility and, moreover, they result in heat wave shielding board that are very expensive.

The present inventors have proposed a coating solution for heat wave shielding made by allowing hexaboride fine particles alone, or hexaboride fine particles and ITO fine particles and/or ATO fine particles, as a heat wave shielding component, to be contained in various binders, and a heat wave shielding film obtained by coating the surface of a transparent base material with this coating solution and then hardening the coated material as in, for instance, Japanese Patent Laid-open No. Hei 11-181336, Japanese Patent Laid-open No. 2000-96034, Japanese Patent Laid-open No. 2000-169765, and so on.

As a means for shielding heat waves, in addition to the above-described method of applying a heat wave reflecting film or a heat wave shielding film on a transparent base material, a heat wave shielding board formed by incorporating mica covered with titanium oxide as heat wave reflection particles in a transparent resin such as acrylic resin or polycarbonate resin as in, for instance, Japanese Patent Laid-open No. Hei 5-78544 or Japanese Patent Laid-open No. Hei 2-173060 has been proposed.

However, this heat wave shielding board needs a large quantity of heat wave reflective particles to achieve good shieldability for heat waves, which causes a problem with visible light transmission. The amount of visible light allowed through decreases as the number of heat reflective particles is increased. Conversely, when the number of heat reflective particles is reduced, visible light transmission is enhanced, but heat wave shieldability is lowered. Therefore, it is difficult to satisfy heat wave shieldability and visible light transmission requirements at the same time. Further, the incorporation of large quantities of heat wave reflective particles weakens the transparent base resin, especially in terms of its impact resistance and toughness.

Considering the above-described drawbacks, an object of the present invention is to provide a heat wave shielding material which can be manufactured by a simple method without using a complicated manufacturing method or a high cost physical film-formation method, has excellent visible light transmission, exhibits high heat wave shieldability, and, furthermore, is excellent in strength such as impact resistance.

DISCLOSURE OF THE INVENTION

In order to achieve the above-described object, the present inventors focused hexaboride fine particles, which contain a large quantity of free electrons, as a component having a heat wave shielding effect. The present inventors have completed the present invention by developing a heat wave shielding resin sheet having a maximum transmittance in the visible light region and at the same time a minimum transmittance in the near-infrared region exhibiting strong absorption, by dispersing the hexaboride fine particles in a transparent resin such as polycarbonate resin or acrylic resin.

The heat wave shielding resin sheet provided by the present invention is characterized in that hexaboride fine particles alone are dispersed, or hexaboride fine particles and ITO fine particles and/or ATO fine particles are dispersed as a heat wave shielding component in a transparent resinous base material.

In the heat wave shielding resin sheet of the above-described present invention, the aforementioned hexaboride is preferably at least one kind selected from the group consisting of $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, and $CaB_6$. Further, all of the aforementioned hexaboride fine particles, ITO fine particles, and ATO fine particles preferably have an average particle diameter of 200 nm or less.

In the heat wave shielding resin sheet of the present invention, the amount of heat wave shielding component is preferably 0.05 g to 19 g per square meter of the heat wave shielding resin sheet. The weight ratio of the hexaboride fine particles to the ITO fine particles and/or the ATO fine particles preferably ranges from 0.1:99.9 to 90:10. Further, the resinous base material is preferably comprised of either polycarbonate resin or acrylic resin.

The heat wave shielding resin sheet of the present invention may have a resin film formed containing an ultraviolet light absorbing agent on at least one surface of the heat wave shielding resin sheet.

The present invention also provides a liquid additive to be used for manufacturing the aforementioned heat wave shielding resin sheet. That is, the liquid additive for manufacturing the heat wave shielding resin sheet of the present invention comprises a liquid additive to make a composition for molding a heat wave shielding resin sheet by mixing the composition with resin or raw materials for the resin, wherein hexaboride fine particles are dispersed, or hexaboride fine particles and ITO fine particles and/or ATO fine particles are dispersed, as a heat wave shielding component, in a solvent.

In the liquid additive for manufacturing the heat wave shielding resin sheet of the present invention, the hexaboride is preferably at least one kind selected from the group consisting of $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, and $CaB_6$.

Further, in the liquid additive for manufacturing the heat wave shielding resin sheet of the present invention, all of the aforementioned hexaboride fine particles, ITO fine particles, and ATO fine particles preferably have an average particle diameter of 200 nm or less. In addition, the weight ratio of hexaboride fine particles to ITO fine particles and/or ATO fine particles preferably ranges from 0.1:99.9 to 90:10.

BEST MODE FOR CARRYING OUT THE INVENTION

A heat wave shielding resin sheet of the present invention is prepared by dispersing hexaboride fine particles either alone as a heat wave shielding component or in combination with ITO fine particles or ATO fine particles in a transparent resinous base material such as polycarbonate resin or acrylic resin, and can be formed in any shape such as a board, a film or a sphere, according to the usage.

A method for manufacturing such a heat wave shielding resin sheet can be arbitrarily selected provided that it can disperse the fine particles of a heat wave shielding component uniformly in a resin. For instance, a method of adding the above-described fine particles to resin directly and melt-mixing them uniformly can be adopted. Especially, a method of preparing a liquid additive by dispersing fine particles of a heat wave shielding component in a solvent and forming a resin sheet using a sheet forming composition prepared by mixing the aforementioned liquid additive and resin or a raw material for the resin is simple and desirable.

As the hexaboride fine particles used for the heat wave shielding component are typically lanthanum hexaboride ($LaB_6$), cerium hexaboride ($CeB_6$), praseodymium hexaboride ($PrB_6$), neodymium hexaboride ($NdB_6$), gadolinium hexaboride ($GdB_6$), terbium hexaboride ($TbB_6$), dysprosium hexaboride ($DyB_6$), holmium hexaboride ($HoB_6$), yttrium hexaboride ($YB_6$), samarium hexaboride ($SmB_6$), europium hexaboride ($EuB_6$), erbium hexaboride ($ErB_6$), thulium hexaboride ($TmB_6$), ytterbium hexaboride ($YbB_6$), lutetium hexaboride ($LuB_6$), strontium hexaboride ($SrB_6$), calcium hexaboride ($CaB_6$), and lanthanum cerium hexaboride ($(La, Ce)B)_6$).

The hexaboride fine particles to be used are preferably not to be oxidized on the surface thereof, but they are usually slightly oxidized, and it is impossible to avoid occurrence of surface oxidation to some degree during the dispersion process of the fine particles. However, even in such a case, effectiveness to exhibit a heat wave shielding effect is unchanged. Further, the higher the perfectness of the boride fine particle as a crystal is, the larger the heat wave shielding effect can be obtained. However, even when hexaboride fine particles are low in crystallinity and are the ones to show a broad diffraction peak by the X-ray diffraction, the hexaboride fine particles can exhibit a heat wave shielding effect, provided that the basic bonding inside the particle is consisted of the metal used and boron.

These hexaboride fine particles are powder colored in grayish black, brownish black, greenish black, or the like. When the above-described hexaboride fine particles having a sufficiently smaller particle size than the wavelength of visible light are dispersed in a resin sheet, the resin sheet can obtain visible light transmittance while keeping sufficiently high infrared light shieldability. The reason is not explicated in detail, but it is considered that there are a lot of free electrons in the fine particles and since the absorption energy of indirect transition between the bands caused by free electrons in the inside and on the surface of the fine particle is in the vicinity between the visible light region and the near-infrared light region, the heat wave in this wavelength region is selectively reflected or absorbed.

More specifically, a resin sheet dispersing hexaboride fine particles sufficiently fine and uniform is observed to have the maximum transmittance value in the wavelength region between 400 nm and 700 nm, and the minimum transmittance value in the wavelength region between 700 nm and 1800 nm, and the difference between the maximum transmittance value and the minimum transmittance value of these transmittance values is 15 point or more. Considering that the visible light wavelength is between 380 nm and 780 nm, and the luminosity is a bell-shaped curve having its peak in the vicinity of 550 nm, it is understood that a resin sheet in which hexaboride fine particles are dispersed allows the visible light to pass through effectively, and reflects or absorbs the heat wave excepting the visible light effectively.

ITO fine particles or ATO fine particles used in combination with hexaboride fine particles scarcely absorbs or reflects light in the visible light region and shows large reflection or absorption due to plasma resonance in the region of 1000 nm or more. It should be noted that the transmittance decreases as forwarding toward a long-wavelength side in the near-infrared region in these transmission profiles. On the other hand, in the transmission profile of hexaborides, the minimum transmittance appears in the vicinity of 1000 nm as described above, and shows gradual increase in transmittance in a longer wavelength side than 1000 nm. Therefore, by using hexaboride in combination with ITO or ATO, it becomes possible to block the heat waves in the near-infrared region without decreasing the visible light transmittancy so that heat wave shielding characteristic is enhanced compared to the case when each of them is used alone.

An average particle diameter of the hexaboride fine particles to be used is preferably 200 nm or less. It is because that when the average particle diameter exceeds 200 nm, cohesion between the fine particles becomes strong, in the dispersion liquid, which causes settlement of the fine particles, and the fine particles serve as the light scattering source in the resin to cause the resin sheet to be looked as if being fogged. An average particle diameter of the fine particles in ITO fine particles or ATO fine particles is preferably 200 nm or less because of the same reason as described above. In the case of a translucent roof material or the like, opaque but not transparent light transmission is sometimes required. In such a case, though it is desirable to increase the particle diameter for enhancing the light scattering, if the particle diameter is too large, the infrared light absorbency itself is also decreased. Therefore, it is still desirable to have the average particle diameter of 200 nm or less.

The heat wave shielding capability per unit weight of the hexaboride fine particles is extremely high and exhibits the same effect as that by ITO fine particles or ATO fine particles with one thirtieth or less of the quantity of ITO or ATO used. Therefore, by using hexaboride fine particles, a favorable heat wave shielding effect can be obtained even with a small quantity of the hexaboride and in addition, when the hexaboride fine particles are used together with ITO fine particles or ATO fine particles, it becomes possible to reduce the quantity of these fine particles so as to realize cost reduction. Further, the total quantity of the fine particles can be substantially reduced, which prevents deterioration of physical properties of the resin to be a base material, especially deterioration of impact strength and toughness.

It should be noted that it is possible to control the absorption in the visible light region freely, to adjust brightness, and to apply to privacy protection by controlling the amount of hexaboride fine particles to the resin sheet or controlling the amount of ITO fine particles and ATO fine particles which are used together with hexaboride fine particles.

The heat wave shielding property is determined by the amount of the heat wave shielding component per unit area of the sheet. However, the amount of heat wave shielding component in relation to resin needs to be determined according to the optical characteristics required and the strength characteristics of the resin sheet, and the like. For instance, even when the amount of the heat wave shielding component satisfies the optical characteristics, if the resin sheet is getting thin, its abrasion resistance or impact strength becomes low. The heat wave shielding component may sometimes comes up to the surface of the resin sheet, which may spoil the appearance. Therefore, when the resin sheet is thin, more concretely, when it is about 20 to 30 μm in thickness, in order to avoid such a trouble, the amount of heat wave shielding component is preferably in the range of 0.05 to 19 g per square meter of the resin sheet. On the other hand, when the resin sheet is getting thick, though it becomes possible to contain a large quantity of the heat wave shielding component, in the case that the thickness of the resin sheet becomes as much as about 3 to 5 mm, the visible light transmission may be lowered if the amount of heat wave shielding component exceeds the above-described 19 $g/m^2$.

When hexaboride fine particles and ITO fine particles and/or ATO fine particles are used together, the weight ratio of the hexaboride fine particles to ITO fine particles and/or ATO fine particles is preferably in the range of 0.1:99.9 to 90:10. When the quantity of the hexaboride fine particles is smaller than this range, the total quantity of the fine particles can not be reduced so much, which lowers cost reduction effect and worsens the heat wave shieldability. When the quantity of the hexaboride fine particles is more than this range, the effect of adding ITO or ATO becomes negligibly small. Note that in the case of the same optical characteristics, the larger the quantity of hexaboride fine particles is, the more quantities of ITO fine particles and ATO fine particles to be used can be reduced, and the effect of cost reduction becomes high.

Though a dispersion method of the heat wave shielding component to the resin is not particularly limited, provided that the fine particles can be dispersed uniformly in the resin, a method to use a liquid additive prepared by dispersing the fine particles into any solvent is preferable. More concretely, using a beads mill, a ball mill, a sand mill, and an ultrasonic dispersing method, the above-described fine particles are dispersed in an arbitrary solvent to be a liquid additive for manufacturing a heat wave shielding resin sheet.

A dispersion medium solvent to be used for such a liquid additive for manufacturing the heat wave shielding resin sheet is not specifically limited, and can be selected in accordance with resin to be incorporated, conditions to form the resin sheet, and the like, so that a commonly used organic solvent can be used. Further, it is also possible to adjust pH by adding acid or alkali as necessary. Furthermore, it is possible to add various surfactants, coupling agents, and so on as a dispersing agent to enhance dispersion stability of the fine particles more in the resin.

In order to manufacture the heat wave shielding resin sheet using the above-described liquid additive, typically, the liquid additive is added to a resin to be a base material, and a mixture in which fine particles are uniformly dispersed in the resin is prepared using a method of melt-mixing the mixture uniformly with a mixer such as ribbon blender, tumbler, Nauta mixer, Henschel mixer, super mixer, planetary mixer and so on, and a kneading machine such as Banbury mixer, kneader, roll, kneader ruder, uniaxial extruder, biaxial extruder, and so on.

When the resin to be a base material is polycarbonate resin, it is possible to prepare a mixture in which the fine particles are dispersed uniformly in the resin by adding the liquid additive to dihydric phenol which is a raw material for the resin, mixing uniformly by a well-known method, and allowing the mixture to react with a carbonate precursor such as phosgene. In the case of acrylic resin, it is possible to prepare a mixture in which the fine particles are dispersed uniformly in acrylic resin by adding the liquid additive to a raw material for the acrylic resin, that is, methyl methacrylate, ethyl methacrylate, propyl methacrylate, butyl methacrylate or the like, mixing uniformly by a well-known method similarly, and allowing the mixture to polymerize by a well-known method such as suspension polymerization, block polymerization or the like.

Further, it is also possible to prepare a mixture in which the fine particles are dispersed uniformly in a resin by removing the solvent in the liquid additive by a well-known method, adding the powder thus obtained to the resin, and melt-mixing the mixture uniformly.

A resin sheet of the present invention can be made by molding the mixture which is prepared by dispersing the fine particles uniformly in a resin as described above, in a flat surface or in a curved surface, using a well-known molding method such as injection molding, extrusion molding, compression molding or the like. It is also possible to make a resin sheet by once pelletizing a mixture in which the fine particles are dispersed uniformly in a resin with a granulator, and molding the resin sheet in a similar manner. It should be noted that the thickness of the resin sheet can be adjusted at an arbitrary thickness from a thick board plate to a thin film as needed.

A heat wave shielding film or an ultraviolet light absorbing film can be formed further on the surface of the above-described resin sheet. For instance, a coating solution which is prepared by dispersing hexaboride fine particles, ITO fine particles or ATO fine particles in various binders is applied on the resin sheet so that a heat wave shielding film is further formed on the surface thereof. An ultraviolet light absorbing film can also be formed by applying a coating solution prepared by dissolving an ultraviolet absorbing agent such as a benzotriazole group, a benzophenone group or the like in various binders on the resin sheet and hardening it to form an ultraviolet light absorbing film, which makes it possible to enhance weather resistance of the resin sheet.

Polycarbonate resin which is a base material for the resin sheet is obtained by reacting dihydric phenol and carbonate precursor using a solution method or a melting method. Typical dihydric phenols are 2,2-bis(4-hydroxyphenyl) propane [bisphenol A], 1,1-bis(4-hydroxyphenyl) ethane, 1,1-bis(4-hydroxyphenyl) cyclohexane, 2,2-bis(4-hydroxy-3,5-dimethylphenyl) propane, 2,2-bis(4-hydroxy-3,5-dibromophenyl) propane, 2,2-bis(4-hydroxy-3-methylphenyl) propane, bis(4-hydroxyphenyl)sulfide, bis(4-hydroxyphenyl) sulfone, and so on. A favorable dihydric phenol is a bis(4-hydroxyphenyl) alkane group and a compound containing bisphenol A as a main component is especially preferable.

As for acrylic resin, a polymer or a co-polymer using methyl methacrylate, ethyl methacrylate, propyl methacrylate or butyl methacrylate as a main raw material, and acrylic ester having an alkyl group with carbon number of 1 to 8, vinyl acetate, styrene, acrylonitrile, methacrylonitrile or the like when necessary as a co-polymer component is used. Further, acrylic resin polymerized in multistage can be used also.

As described above, it is possible to provide a heat wave shielding resin sheet having heat wave shieldability, and a high transmission property in the visible light region by dispersing uniformly the hexaboride fine particles having strong absorption in the near-infrared region as a heat wave shielding component in the resin and forming in a sheet without using a high cost physical film-forming method or a complicated bonding process.

In the case of a heat wave shielding resin sheet in which the hexaboride fine particles are dispersed together with ATO fine particles and ITO fine particles as a heat wave shielding component in the resin, the heat wave shielding characteristics can be more enhanced than the case when respective fine particles are used alone, the used quantity of expensive ATO or ITO can be reduced more compared with the case of using ATO or ITO alone so that the material cost can be reduced.

Further, since the hexaboride fine particles are low in water resistance, it has a defect of deteriorating itself affected by moisture and changing its optical characteristics. However, a resin sheet of the present invention in which hexaboride fine particles are dispersed in the resin can shield the hexaboride fine particles from coming into contact with water so that the change in the optical characteristics can be prevented.

EXAMPLE 1

20 g of $LaB_6$ fine particles having an average particle diameter of 67 nm, 70 g of toluene, water and a proper quantity of dispersing agent are mixed and put them in a ball mill with zirconia balls of 4 mm in diameter and mixed for 100 hours to obtain 100 g of a liquid additive (A1 liquid). Also, 20 g of ITO fine particles having an average particle diameter of 80 nm, 70 g of toluene, water and a proper quantity of dispersing agent are mixed and put them in a ball mill to mix in a similar manner to obtain 100 g of another liquid additive (B1 liquid). Further, 20 g of ATO fine particles having an average particle diameter of 55 nm, 70 g of toluene, water and a proper quantity of dispersing agent are mixed and put them in a ball mill to mix thorough in a similar manner to obtain 100 g of yet another liquid additive (C1 liquid).

Next, the above-described A1 liquid and B1 liquid are mixed to prepare a liquid additive for polycarbonate, and this liquid additive is added to polycarbonate resin to be the ITO concentration of 0.155 wt %, and the $LaB_6$ concentration of 0.00097 wt %. After melt-mixing the mixture uniformly with a blender and a biaxial extruder, extrusion molded in a thickness of 3 mm with a T-die to produce a heat wave shielding polycarbonate sheet (Sample 1) in which the heat wave shielding fine particles are dispersed uniformly throughout.

In a similar manner as described above, A1 liquid, polycarbonate resin and B liquid or C liquid as necessary are mixed to be compositions shown in Samples 2 to 10 in the following Table 1 so that the heat wave shielding polycarbonate sheets (Samples 2 to 10) in which the heat wave shielding fine particles are uniformly dispersed throughout.

For respective heat wave shielding polycarbonate sheet Samples 1 to 10 obtained thus, respective spectral characteristics are measured with the spectrophotometer U-4000 made by Hitachi, Ltd, and the visible light transmittance and the solar radiation transmittance showing the heat wave shielding property are calculated according to JIS R3106. The results obtained are shown in Table 1 below.

COMPARISON EXAMPLE 1

In a similar manner as Example 1, but A1 liquid is not used, B1 liquid or C1 liquid and the polycarbonate resin are mixed to be compositions shown in Samples 11 to 12 in the following Table 1 so that the heat wave shielding polycarbonate sheets (Samples 11 to 12) in which ITO or ATO fine particles are uniformly dispersed throughout. The measurement results similarly performed as in Example 1 are shown together in Table 1 below.

EXAMPLE 2

An ultraviolet light absorbing film is formed on the surface of the heat wave shielding polycarbonate sheet of Sample 2 ($LaB_6$ and ITO are used together) in the above-described Example 1. That is, a coating solution is prepared by mixing 2 wt % of benzotriazole base ultraviolet absorbing agent (made by Ciba Speciality: Commercial Name TINUVING 384), 10 wt % of acrylic resin, 88 wt % of toluene. 15 g of this coating solution is applied on the sheet Sample 2 with a spin coater and the coated Sample 2 is heated for 30 minutes in an electric oven at 100° C. to form an ultraviolet light absorbing film.

The heat wave shielding polycarbonate sheet with the ultraviolet light absorbing film thus obtained (Sample 13) is evaluated in a similar manner to Example 1. The results are shown in Table 1 below.

COMPARISON EXAMPLE 2

Similarly to the above-described Example 1, A1 liquid, C1 liquid, and polycarbonate resin are mixed to be a composition shown in Sample 14 of Table 1 below so as to obtain a heat wave shielding polycarbonate sheet (Sample 14) in which the heat wave shielding fine particles are dispersed uniformly throughout.

Since the heat wave shielding polycarbonate sheet of Sample 14 obtained thus contains the heat wave shielding fine particles in too large quantity, the heat wave shielding component comes up to the surface to make the whole sheet white and dull. The evaluation results of the heat wave shielding polycarbonate sheet Sample 14 performed in a similar manner to Example 1 are also shown in Table 1 below.

TABLE 1

| Sample | Heat wave shielding sheet composition (wt %) | | | Total quantity of fine particles ($g/m^2$) | Visible light transmittance (%) | Solar radiation transmittance (%) |
| --- | --- | --- | --- | --- | --- | --- |
| | $LaB_6$ | ITO | ATO | | | |
| 1 | 0.00097 | 0.155 | 0 | 5.79 | 78 | 55.6 |
| 2 | 0.0013 | 0.092 | 0 | 3.36 | 78 | 54.2 |
| 3 | 0.0018 | 0.082 | 0 | 3.02 | 78 | 54.7 |
| 4 | 0.0022 | 0.067 | 0 | 2.49 | 78 | 57.5 |
| 5 | 0.0035 | 0.030 | 0 | 1.20 | 78 | 59.3 |
| 6 | 0.0050 | 0 | 0 | 0.18 | 78 | 59.7 |
| 7 | 0.00097 | 0 | 0.51 | 18.70 | 78 | 62.5 |

TABLE 1-continued

| Sample | Heat wave shielding sheet composition (wt %) | | | Total quantity of fine particles (g/m$^2$) | Visible light transmittance (%) | Solar radiation transmittance (%) |
|---|---|---|---|---|---|---|
| | LaB$_6$ | ITO | ATO | | | |
| 8 | 0.0028 | 0 | 0.27 | 9.82 | 78 | 61.3 |
| 9 | 0.0040 | 0 | 0.20 | 7.34 | 78 | 61.0 |
| 10 | 0.0042 | 0 | 0.15 | 5.55 | 78 | 62.0 |
| 11* | 0 | 0.18 | 0 | 6.48 | 78 | 57.8 |
| 12* | 0 | 0 | 0.61 | 21.96 | 78 | 63.1 |
| 13 | 0.0013 | 0.092 | 0 | 3.36 | 77 | 54.2 |
| 14* | 0.0020 | 0 | 0.70 | 25.27 | 52 | 38.1 |

(Notes)
The samples attached with * in the table are Comparison Examples.

From the above-described results in Table 1, it is understood that addition of a very small quantity of LaB$_6$ as a heat wave shielding component can reduce the solar radiation transmittance equally or more without lowering the visible light transmittance compared with the characteristics of conventional ITO or ATO. In addition, this effect can be obtained without addition of ITO or ATO, and further, when ITO or ATO is used together, the quantity of addition can be reduced largely.

For instance, when Sample 2 in the examples of the present invention and Sample 11 in the comparison examples are compared, the sheet Sample 2 can reduce the solar radiation transmittance by 3 point or more than Sample 11 and the quantity of ITO to be added can be reduced by half or more, by addition of LaB$_6$ in an amount of 1.39 wt % of the total fine particles in the film while keeping the visible light transmittance to be 78%.

EXAMPLE 3

For the heat wave shielding polycarbonate sheet in Sample 4 of the above-described Example 1, water resistance test is performed. That is, after immersing the sheet Sample 4 in water for 10 days, the optical characteristics is measured again in a similar manner to Example 1. The visible light transmittance is 78% and the solar radiation transmittance is 57.5%, and thus, no change in optical characteristics is observed.

EXAMPLE 4

20 g of CeB$_6$ fine particles having an average particle diameter of 85 nm, 70 g of toluene, water, and a proper quantity of dispersing agent are mixed and put them in a ball mill with zirconia balls of 4 mm in diameter and mixed for 100 hours to obtain 100 g of a liquid additive (D1 liquid). Similarly to the above-described Example 1, D1 liquid, B1 liquid, and polycarbonate resin are mixed to be a composition shown in Sample 15 of Table 2 below so as to obtain a heat wave shielding polycarbonate sheet (Sample 15) in which the heat wave shielding fine particles are dispersed uniformly throughout.

In addition, using PrB$_6$ fine particles, NdB$_6$ fine particles, GdB$_6$ fine particles, YB$_6$ fine particles, SmB$_6$ fine particles, or EuB$_6$ fine particles, instead of the above-described CeB$_6$ fine particles, each liquid additive is made similarly as described above. These liquid additives are mixed with polycarbonate resin, and B1 liquid or C1 liquid as necessary to be compositions shown in Samples 16 to 21 of Table 2 below, so as to obtain heat wave shielding polycarbonate sheets (Samples 16 to 21) in which the heat wave shielding fine particles are dispersed uniformly throughout.

For the respective heat wave shielding polycarbonate sheets Samples 15 to 21, the results of evaluation in a similar manner to Example 1 are shown in Table 2.

TABLE 2

| Sample | Heat wave shielding sheet composition (wt %) | | | Total quantity of fine particles (g/m$^2$) | Visible light transmittance (%) | Solar radiation transmittance (%) |
|---|---|---|---|---|---|---|
| | Hexaboride | ITO | ATO | | | |
| 15 | CeB$_6$/0.0020 | 0.083 | 0 | 3.06 | 77 | 53.8 |
| 16 | PrB$_6$/0.0022 | 0.080 | 0 | 2.96 | 77 | 54.1 |
| 17 | NdB$_6$/0.0028 | 0 | 0.27 | 9.82 | 78 | 62.1 |
| 18 | GdB$_6$/0.0027 | 0 | 0.29 | 10.53 | 78 | 61.9 |
| 19 | YB$_6$/0.0018 | 0.073 | 0 | 2.69 | 78 | 54.0 |
| 20 | SmB$_6$/0.0040 | 0 | 0.20 | 7.34 | 77 | 61.5 |
| 21 | EuB$_6$/0.0040 | 0 | 0.18 | 6.62 | 77 | 61.8 |

It is understood that excellent visible light transmission and heat wave ng effect can be obtained even when the hexaboride fine particles such as CeB$_6$ fine particles, PrB$_6$ fine particles, NdB$_6$ fine particles, GdB$_6$ fine particles, YB$_6$ fine particles, SmB$_6$ fine particles, or EuB$_6$ fine particles are used instead of the heat wave shielding component LaB$_6$ fine particles.

EXAMPLE 5

20 g of LaB$_6$ fine particles having an average particle diameter of 67 nm, 70 g of toluene, water and a proper quantity of dispersing agent are mixed and put them in a ball mill with zirconia balls of 4 mm in diameter and mixed for 100 hours to obtain 100 g of a liquid additive (A2 liquid). Also, 20 g of ITO fine particles having an average particle diameter of 80 nm, 70 g of toluene, water and a proper quantity of dispersing agent are mixed and put them in a ball mill to mix in a similar manner to obtain 100 g of a liquid additive (B2 liquid). Further, 20 g of ATO fine particles having an average particle diameter of 55 nm, 70 g of toluene, water and a proper quantity of dispersing agent are mixed and put them in a ball mill to mix thorough in a similar manner to obtain 100 g of a liquid additive (C2 liquid).

Next, the above-described A2 liquid and B2 liquid are mixed to prepare a liquid additive for acrylic resin, and this liquid additive is added to acrylic resin to have ITO concentration of 0.13 wt %, and LaB$_6$ concentration of 0.0012 wt %. After melt-mixing the mixture uniformly with a blender, and a biaxial extruder, it is extrusion-molded in a thickness of 3 mm with a T-die to produce a heat wave shielding acrylic sheet (Sample 22) in which the heat wave shielding fine particles are dispersed uniformly throughout.

In a similar manner as described above, A2 liquid, acrylic resin and B2 liquid or C2 liquid as necessary are mixed to be compositions shown in Samples 23 to 31 in the Table 3 below so as to obtain heat wave shielding acrylic sheets (Samples 23 to 31) in which the heat wave shielding fine particles are uniformly dispersed throughout.

For respective heat wave shielding acrylic sheets Samples 22 to 31 obtained thus, respective spectral characteristics are measured with the spectrophotometer U-4000 made by Hitachi, Ltd, and the visible light transmittance and the solar radiation transmittance showing the heat wave shielding property are calculated according to JIS R3106. The results obtained are shown in Table 3 below.

COMPARISON EXAMPLE 3

In a similar manner as Example 5, but A2 liquid is not used, B2 liquid or C2 liquid and the acrylic resin are mixed to be compositions shown in Samples 32 to 33 in the following Table 3 so as to obtain heat wave shielding acrylic sheets (Samples 32 to 33) in which the heat wave shielding fine particles are uniformly dispersed throughout. The measurement results similarly performed as in Example 5 are shown together in Table 3 below.

EXAMPLE 6

A liquid additive prepared by mixing A2 liquid and B2 liquid in the above-described Example 5 is added to the acrylic resin to have ITO concentration of 0.094 wt %, and $LaB_6$ concentration of 0.0012 wt %. After melt-mixing the mixture uniformly with a blender, it is extrusion-molded in a thickness of 3 mm with a T-die to obtain a heat wave shielding acrylic sheet in which the heat wave shielding fine particles are dispersed uniformly throughout.

15 g of a coating solution prepared by mixing 2 wt % of benzotriazole base ultraviolet absorbing agent (made by Ciba Speciality: Commercial Name. TINUVING 384), 10 wt % of acrylic resin, 88 wt % of toluene is applied on a surface of the heat wave shielding acrylic sheet with a spin coater and it is heated for 30 minutes in an electric oven at 100° C. to form an ultraviolet light absorbing film.

The heat wave shielding polycarbonate sheet with the ultraviolet light absorbing film (Sample 34) thus obtained is evaluated in a similar manner to Example 5. The results are shown in Table 3 below.

COMPARISON EXAMPLE 4

Similarly to the above-described Example 5, A2 liquid, C2 liquid, and acrylic resin are mixed to be a composition shown in Sample 35 of Table 3 below so as to obtain a heat wave shielding acrylic sheet (Sample 35) in which the heat wave shielding fine particles are dispersed uniformly throughout.

Since the heat wave shielding acrylic sheet of Sample 35 obtained thus contains the heat wave shielding fine particles in too large quantity, the heat wave shielding component comes up to the surface to make the whole sheet white and dull. The evaluation results of the heat wave shielding acrylic sheet Sample 35 performed in a similar manner to Example 5 are also shown in Table 3 below.

TABLE 3

| Sample | Heat wave shielding sheet composition (wt %) | | | Total quantity of fine particles ($g/m^2$) | Visible light transmittance (%) | Solar radiation transmittance (%) |
| --- | --- | --- | --- | --- | --- | --- |
| | $LaB_6$ | ITO | ATO | | | |
| 22 | 0.0012 | 0.13 | 0 | 4.72 | 78 | 55.3 |
| 23 | 0.0016 | 0.077 | 0 | 2.83 | 78 | 54.5 |
| 24 | 0.0022 | 0.068 | 0 | 2.53 | 78 | 54.9 |
| 25 | 0.0026 | 0.056 | 0 | 2.11 | 78 | 56.9 |
| 26 | 0.0042 | 0.025 | 0 | 1.05 | 78 | 59.3 |
| 27 | 0.0049 | 0 | 0 | 0.18 | 78 | 59.8 |
| 28 | 0.0011 | 0 | 0.46 | 16.60 | 78 | 62.9 |
| 29 | 0.0031 | 0 | 0.25 | 9.11 | 78 | 62.4 |
| 30 | 0.0044 | 0 | 0.18 | 6.63 | 78 | 61.5 |
| 31 | 0.0046 | 0 | 0.14 | 5.20 | 78 | 62.9 |
| 32* | 0 | 0.18 | 0 | 6.48 | 78 | 57.3 |
| 33* | 0 | 0 | 0.60 | 21.60 | 78 | 64.9 |
| 34 | 0.0012 | 0.094 | 0 | 3.43 | 77 | 55.0 |
| 35* | 0.0019 | 0 | 0.74 | 26.71 | 51 | 37.1 |

(Notes)
The samples attached with * in the table are Comparison Examples.

From the above-described results in Table 3, it is understood that addition of a very small quantity of $LaB_6$ as a heat wave shielding component to acrylic resin can reduce the solar radiation transmittance equally or more without lowering the visible light transmittance compared with the characteristics of the conventional ITO or ATO. In addition, this effect can be obtained without addition of ITO or ATO, and further, when ITO or ATO is used together, the quantity to be added can be reduced largely.

For instance, when Sample 23 in examples of the present invention and Sample 32 in comparison examples are compared, the sheet Sample 23 can reduce the solar radiation transmittance by 3 point or more than Sample 32 in the comparison examples and the quantity of ITO to be added can be reduced by half or more, by addition of $LaB_6$ fine particles in an amount of 2.03 wt % of the total fine particles in the film while keeping the visible light transmittance to be 78%.

EXAMPLE 7

For the heat wave shielding acrylic sheet in Sample 25 of the above-described Example 5, water resistance test is performed. That is, after immersing the sheet Sample 25 in water for 10 days, the optical characteristics is measured again in a similar manner to Example 1. The visible light transmittance is 78% and the solar radiation transmittance is 56.9%, and thus, no change in optical characteristics is observed.

EXAMPLE 8

20 g of $CeB_6$ fine particles having an average particle diameter of 85 nm, 70 g of toluene, water, and a proper quantity of dispersing agent are mixed and put them in a ball mill with zirconia balls of 4 mm in diameter and mixed for 100 hours to obtain 100 g of a liquid additive (D2 liquid). Similarly to the above-described Example 5, D2 liquid, B2 liquid, and acrylic resin are mixed to be a composition shown in Sample 36 of Table 4 below so as to obtain a heat wave shielding acrylic sheet (Sample 36) in which the heat wave shielding fine particles are dispersed uniformly throughout.

In addition, using $PrB_6$ fine particles, $NdB_6$ fine particles, $GdB_6$ fine particles, $YB_6$ fine particles, $SmB_6$ fine particles, or $EuB_6$ fine particles, instead of the above-described $CeB_6$ fine particles, liquid additives are made similarly as described above respectively. These liquid additives are mixed with acrylic resin, and B2 liquid or C2 liquid as necessary to be compositions shown in Samples 37 to 42 of Table 4 below, heat wave shielding acrylic sheets (Samples 37 to 42) are prepared in which the heat wave shielding fine particles are dispersed uniformly throughout.

For the respective heat wave shielding acrylic sheets Samples 36 to 42 obtained thus, the results of evaluation in a similar manner to Example 5 are shown in Table 4.

TABLE 4

| Sample | Heat wave shielding sheet composition (wt %) | | | Total quantity of fine particles (g/m²) | Visible light transmittance (%) | Solar radiation transmittance (%) |
|---|---|---|---|---|---|---|
| | Hexaboride | ITO | ATO | | | |
| 36 | CeB₆/0.0020 | 0.085 | 0 | 3.13 | 77 | 53.3 |
| 37 | PrB₆/0.0022 | 0.081 | 0 | 3.00 | 77 | 55.1 |
| 38 | NdB₆/0.0030 | 0 | 0.26 | 9.47 | 78 | 63.4 |
| 39 | GdB₆/0.0030 | 0 | 0.28 | 10.19 | 78 | 61.9 |
| 40 | YB₆/0.0018 | 0.073 | 0 | 2.69 | 78 | 53.7 |
| 41 | SmB₆/0.0039 | 0 | 0.21 | 7.70 | 77 | 62.0 |
| 42 | EuB₆/0.0039 | 0 | 0.18 | 6.62 | 77 | 62.1 |

EXAMPLE 9

For each of the heat wave shielding polycarbonate sheet Sample 10 in the above-described Example 1, the heat wave shielding polycarbonate sheet Sample 14 which contains an excessive quantity of the heat wave shielding component, and the polycarbonate sheet (Sample 43) which does not contain a heat wave shielding component, measurement of Izod impact strength is performed according to ASTM D-256 (with an Izod notch). The results obtained are shown in Table 5 below.

TABLE 5

| Sample | Total quantity of fine particle (g/m²) | Impact strength (kg · cm/cm) |
|---|---|---|
| 10 | 5.55 | 77 |
| 14* | 25.27 | 35 |
| 43* | 0 | 78 |

(Notes)
The samples attached with * in the table are Comparison Examples.

It is understood that the heat wave polycarbonate sheet Sample 10 of the present invention has a similar impact resistance to that of the polycarbonate sheet Sample 43 which has no heat wave shielding component. However, in the heat wave shielding polycarbonate sheet Sample 14 which is a comparison example and has an excess amount of a heat wave shielding component, its impact resistance is remarkably low compared with the above Samples 10 and 43.

INDUSTRIAL AVAILABILITY

The present invention enables to provide a heat wave shielding resin sheet which can be produced with a simple method of dispersing hexaboride fine particles in resin uniformly without using a high cost physical film-formation method or a complicated bonding process, has a high heat wave shielding function, and is excellent in visible light transmission property. Further, since the hexaboride fine particles are dispersively packed in the resin, contact of the hexaboride fine particles with water is shielded, which makes this heat wave shielding resin sheet excellent in water resistance.

Further, by using hexaboride fine particles having strong absorption in the near-infrared region in the heat wave shielding resin sheet, a high heat wave shielding effect can be obtained with a small quantity of the heat wave shielding component, and when hexaboride fine particles are used together with ATO fine particles or ITO fine particles, the quantity to be used can be reduced so that the material cost can be reduced. Further, since the total quantity of fine particles of the heat wave shielding component can be substantially reduced, the physical property of the base material resin, especially impact resistance or toughness is prevented from lowering.

Therefore, since the heat wave shielding resin sheet of the present invention can block the solar energy coming from opening by applying a heat wave shielding resin sheet on an opening such as a window of buildings and vehicles, it has an effect of reducing a cooling load or a feeling of intense heat, which is very useful from an energy-saving point of view.

The invention claimed is:

1. A heat wave shield consisting of a molded single-layered transparent sheet consisting of a resin of polycarbonate resin or acrylic resin, hexaboride fine particles having an average particle diameter of 200 nm or less, and a dispersing agent,
   wherein hexaboride of the hexaboride fine particles is $LaB_6$;
   the hexaboride fine particles are present in the molded single-layered transparent sheet in an amount from 0.05 g/m² to 0.18 g/m² and from 0.0049 wt % to 0.0050 wt %; and
   the molded single-layered transparent sheet has a solar radiation transmittance of 59.7% to 59.8% when the thickness of the molded single-layered transparent sheet is 3 mm and a visible light transmittance thereof is 78%; and
   the molded single-layered transparent sheet has a maximum transmittance value in a wavelength region between 400 nm and 700 nm, and a minimum transmittance value in a vicinity of 1000 nm, a transmittance value gradually increases in a longer wavelength side than the minimum transmittance value, and a difference between the maximum transmittance value and the minimum transmittance value is 15 or more.

2. A heat wave shield consisting of:
   a molded single-layered transparent sheet consisting of a resin of polycarbonate resin or acrylic resin, hexaboride fine particles having an average particle diameter of 200 nm or less, a dispersing agent, and an outer resin film consisting of an ultraviolet light absorbing agent and a resin, and coated on at least one surface of the molded single-layered transparent sheet,
   wherein hexaboride of the hexaboride fine particles is $LaB_6$,
   the hexaboride fine particles are present in the molded single-layered transparent sheet in an amount from 0.05 g/m² to 0.18 g/m² and from 0.0049 wt % 0.0050 wt %,
   the molded single-layered transparent sheet has a solar radiation transmittance of 59.7% to 59.8%, when the thickness of the molded single-layered transparent sheet is 3 mm and a visible light transmittance thereof is 78%, and
   the molded single-layered transparent sheet has a maximum transmittance value in a wavelength re ion between 400 nm and 700 nm, and a minimum transmittance value in a vicinity of 1000 nm, a transmittance value gradually increases in a longer wavelength side than the minimum transmittance value, and a difference between the maximum transmittance value and the minimum transmittance value is 15 or more.

3. The heat wave shield according to claim 2, wherein the resin contained in the outer resin film is acrylic resin.

* * * * *